United States Patent [19]
Setsuko

[11] Patent Number: 5,839,518
[45] Date of Patent: Nov. 24, 1998

[54] CENTRIFUGAL FORCE-CONTROLLED COUPLING SWITCH MECHANISM FOR AN ELECTRIC DRILL

[76] Inventor: Shibata Setsuko, 5-14-7-505, Higashi-Ohi, Shinagawa-Ku, Tokyo, Japan

[21] Appl. No.: 895,030

[22] Filed: Jul. 16, 1997

[51] Int. Cl.⁶ ............................................. B23Q 5/00
[52] U.S. Cl. .......................... 173/176; 173/179; 173/93; 173/93.5
[58] Field of Search .................... 173/176, 178, 173/179, 93, 93.5, 93.6, 93.7; 81/57.14, 467, 63, 473, 54

[56] References Cited

U.S. PATENT DOCUMENTS

| | | | |
|---|---|---|---|
| 4,947,939 | 8/1990 | Hung | 173/93 |
| 5,080,180 | 1/1992 | Hansson | 173/93 |
| 5,379,851 | 1/1995 | Huang | 173/179 |
| 5,412,546 | 5/1995 | Huang | 81/54 |
| 5,435,398 | 7/1995 | Juan | 173/176 |
| 5,740,892 | 4/1998 | Huang | 173/93 |

*Primary Examiner*—Scott A. Smith
*Attorney, Agent, or Firm*—Bacon & Thomas

[57] ABSTRACT

A centrifugal force-controlled coupling switch mechanism including a rotary base coupled between a reversible motor shaft of a reversible motor and an output shaft, an eccentric block pivoted to the rotary base and adapted for controlling engagement between the rotary base and the output shaft, a clutch adapted for controlling the engagement between the eccentric block and the output shaft, the clutch including a clutch body having two forward locating pins forced by a spring to disengage the eccentric block from the output shaft, and three smoothly curved actuating plates equiangularly retained to the clutch body by a spring retainer and forced by a centrifugal force to expand and to push the clutch body backwards in disengaging its locating pins from the eccentric block for permitting the eccentric block to be forced into engagement with the fixed coupling block of the output shaft by the centrifugal force when, the rotary base is turned with the clutch body by the reversible motor shaft of the reversible motor.

1 Claim, 4 Drawing Sheets

5,839,518

CENTRIFUGAL FORCE-CONTROLLED COUPLING SWITCH MECHANISM FOR AN ELECTRIC DRILL

BACKGROUND OF THE INVENTION (a) Field of the Invention

The present invention relates to a centrifugal force-controlled coupling switch mechanism mounted between a reversible motor shaft of a reversible motor and an output shaft to control transmission of rotary driving power from the reversible motor to the output shaft by means of the application of a centrifugal force.

(b) Description of the Prior Art

Regular power wrenches or drills for loosening or tightening a bolt/nut are commonly comprised of an electric motor mounted inside a housing, a torque/rotation transmission mechanism disposed inside the housing and coupled to the electric motor and adapted for driving a driving tip extending out of a front end of the housing for engagement with a bolt/nut to be loosened or tightened, the transmission mechanism including a cylindrical main body with a cylindrical projection concentrically integral therewith to connected to the spindle of the motor so as to transmit rotation to the main body, and a coupling member pivotably mounted on the main body and controlled by a centrifugal force-controlled coupling switch (centrifugal clutch) to intermittently hit an output shaft along a circumferential direction to apply a torque impulse to the output shaft for loosening or tightening the bolt or nut. U.S. Pat. No. 5,412,546 discloses a power wrench having a similar design. FIG. 1 shows a centrifugal force-controlled coupling switch mechanism for use in an electric drill for controlling transmission of rotary driving power from a motor shaft of a reversible motor to an output shaft. This structure of centrifugal force-controlled coupling switch mechanism comprises a substantially U-shaped locating plate 10 having a center hole 101, two actuating plates 20;20' movably coupled to the U-shaped locating plate 10 at two opposite sides, a stop plate 30, a spring 40, and a counterweight 50. When the motor speed surpasses a predetermined range, the counterweight 50 is forced by a centrifugal force to stretch the spring 40, causing the actuating plates 20;20' to expand and to switch on the switch. This structure of centrifugal force-controlled coupling switch mechanism is still not satisfactory in function. Because the two actuating plates 20;20' tend to deviate from each other, the rotary driving power of the motor cannot smoothly transmitted to the output shaft.

SUMMARY OF THE INVENTION

The present invention has been accomplished to provide a centrifugal force-driven coupling switch mechanism which stably and efficiently transmits the rotary driving power from a reversible motor to an output shaft. According to the preferred embodiment of the present invention, the centrifugal force-controlled coupling switch mechanism comprises a rotary base coupled between a reversible motor shaft of a reversible motor and an output shaft, an eccentric block pivoted to the rotary base and adapted for controlling engagement between the rotary base and the output shaft, and clutch means adapted for controlling the engagement between the eccentric block and the output shaft, wherein the clutch means comprises a clutch body having two forward locating pins forced by a spring to disengage the eccentric block from the output shaft, and three smoothly curved actuating plates equiangularly retained to the clutch body by a spring retainer and forced by a centrifugal force to expand and to push the clutch body backwards in disengaging its locating pins from the eccentric block for permitting the eccentric block to be forced into engagement with the fixed coupling block of the output shaft by the centrifugal force when the rotary base is turned with the clutch body by the reversible motor shaft of the reversible motor.

DETAILED DESCRIPTION OF THE PREFERRED EMBODIMENT

Figure 1:
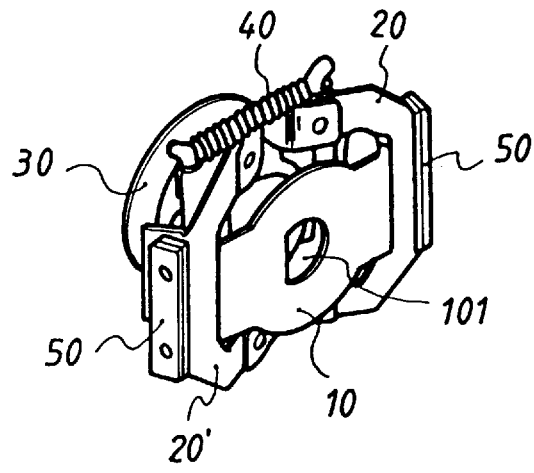
FIG. 1 is an elevational view of a centrifugal force-controlled coupling switch mechanism for an electric drill according to the prior art.
Figure 2:
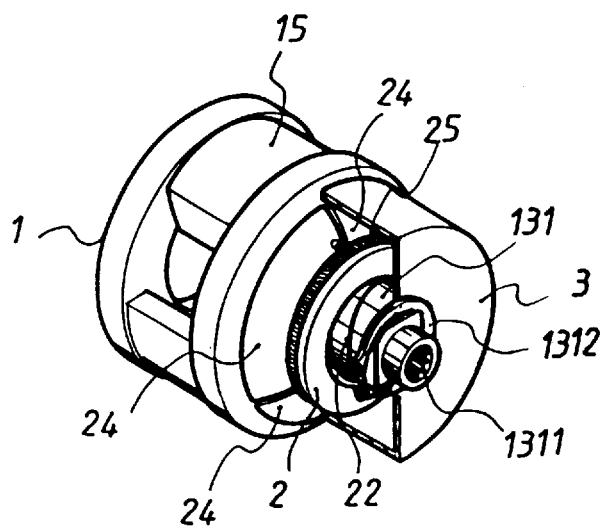
FIG. 2 is a cutaway view of a centrifugal force-controlled coupling switch mechanism for an electric drill according to the present invention.
Figure 3:
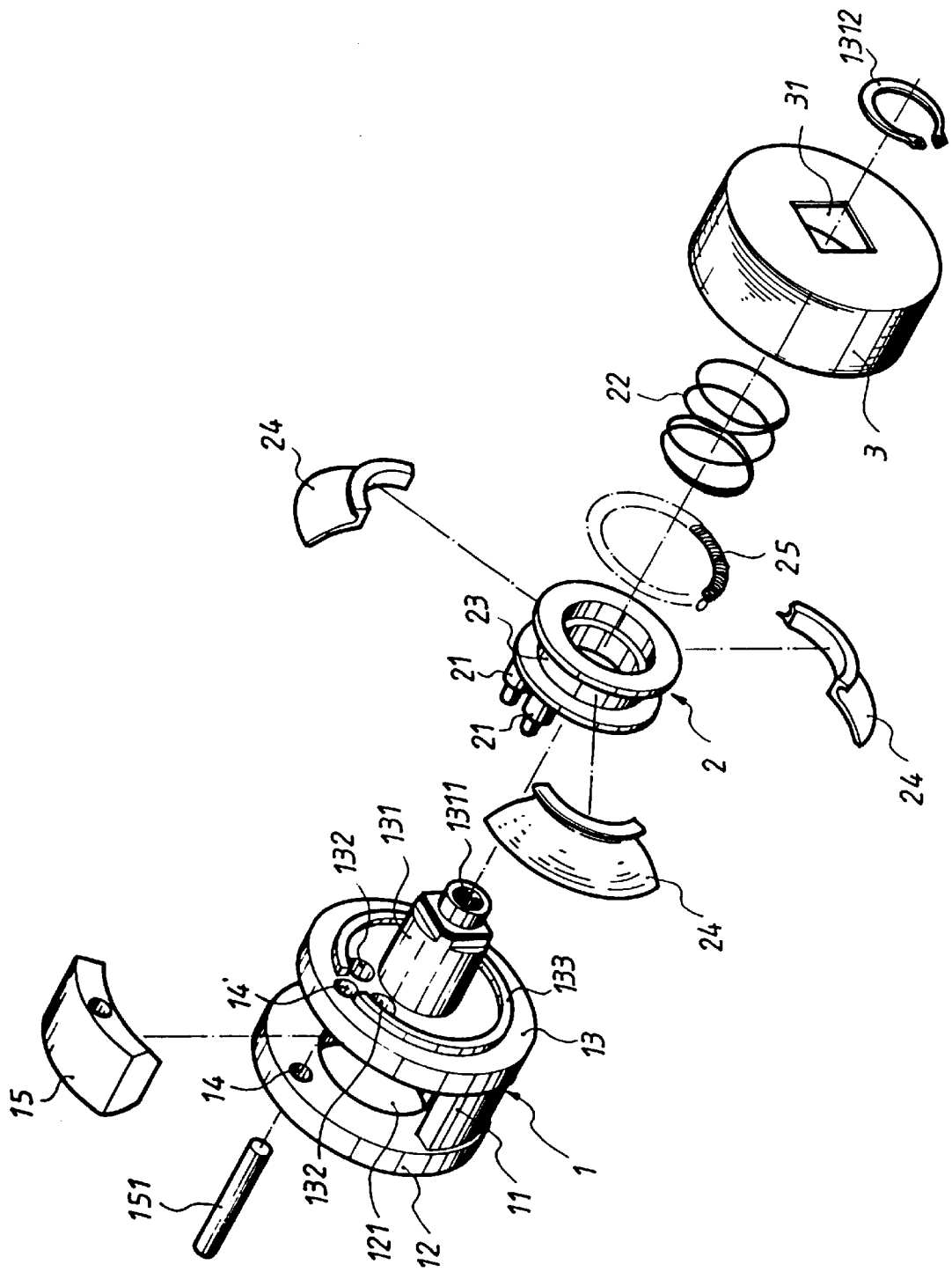
FIG. 3 is an exploded view of the centrifugal force-controlled coupling switch mechanism shown in FIG. 2.
Figure 4:
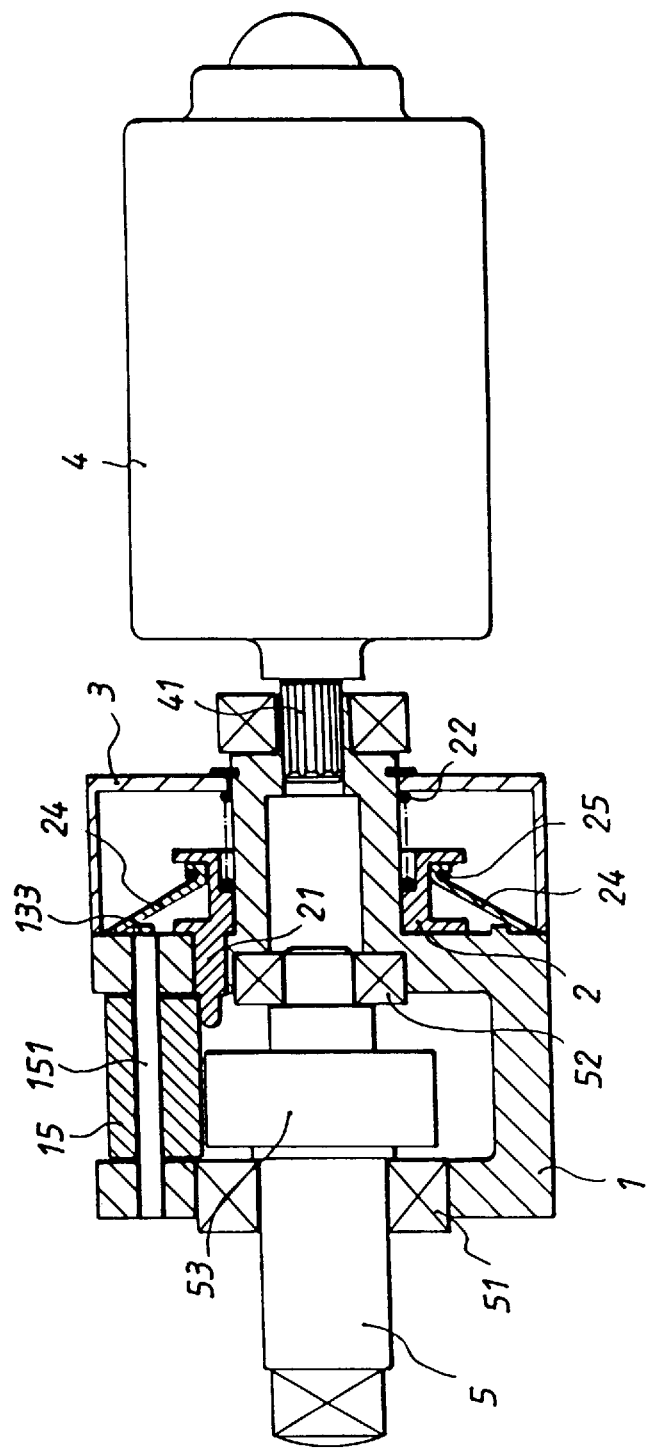
FIG. 4 is a sectional assembly view of the present invention, showing the centrifugal force-controlled coupling switch mechanism coupled between a reversible motor shaft of a reversible motor and an output shaft.

Referring to FIGS. from 2 to 4, a centrifugal force-controlled coupling switch mechanism in accordance with the present invention is generally comprised of a rotary base 1, a clutch 2, and a cap 3. The rotary base 1 comprises an outer race 12, an inner race 13, and a hemispherical shell 11 axially connected between the outer race 12 and the inner race 13. The outer race 12 comprises a center hole 121, and an axial pin hole 14 at an eccentric location. The inner race 13 comprises a backwardly extended stepped enter tube 131 having an internally toothed axial coupling hole 1311 adapted for engaging a reversible motor shaft 41 of a reversible motor 4 (see FIG. 4), an axial pin hole 14' at an eccentric location in alignment with the axial pin hole 14 of the outer race 12, a flange 133 raised from its one side and spaced around the axial center tube 131, and two insertion holes 132. An output shaft 5 is revolvably supported on axle bearings 51;52 in the outer race 12 and inner race 13 of the rotary base 1, having a fixed coupling block 53 spaced between the outer race 12 and the inner race 13. A pivot pin 151 is fastened to the pin holes 14;14' to hold an eccentric block 15 between the outer race 12 and the inner race 13. When the eccentric block 15 is forced to turn about the pivot pin 151 in one direction, it is forced into engagement with the fixed coupling block 53 of the output shaft 5, thereby causing the output shaft 15 to be turned with the rotary base 1. The clutch 2 is a hollow cylindrical member mounted around the axial center tube 131 of the rotary base 1, having a stepped inner diameter, two stepped locating pins 21 axially raised from its front side at eccentric locations and respectively inserted into the insertion holes 132 of the rotary base 1, and an annular groove 23 around the periphery. Three smoothly curved actuating plates 24 are mounted in the annular groove 23 and retained in place by a spring retainer 25. When the smoothly curved actuating plates 24 are installed, they are abutted against one another and form a bowl. A compression spring 22 is mounted in the stepped inner diameter of the clutch 2 and held down by the cap 3. The cap 3 is mounted on the axial center tube 131 of the rotary base 1 and covered over the clutch 2 and retained in place by a clamp 1312, having a center coupling hole 31 which receives the axial center tube 131 of the rotary base 1.

Figure 5:
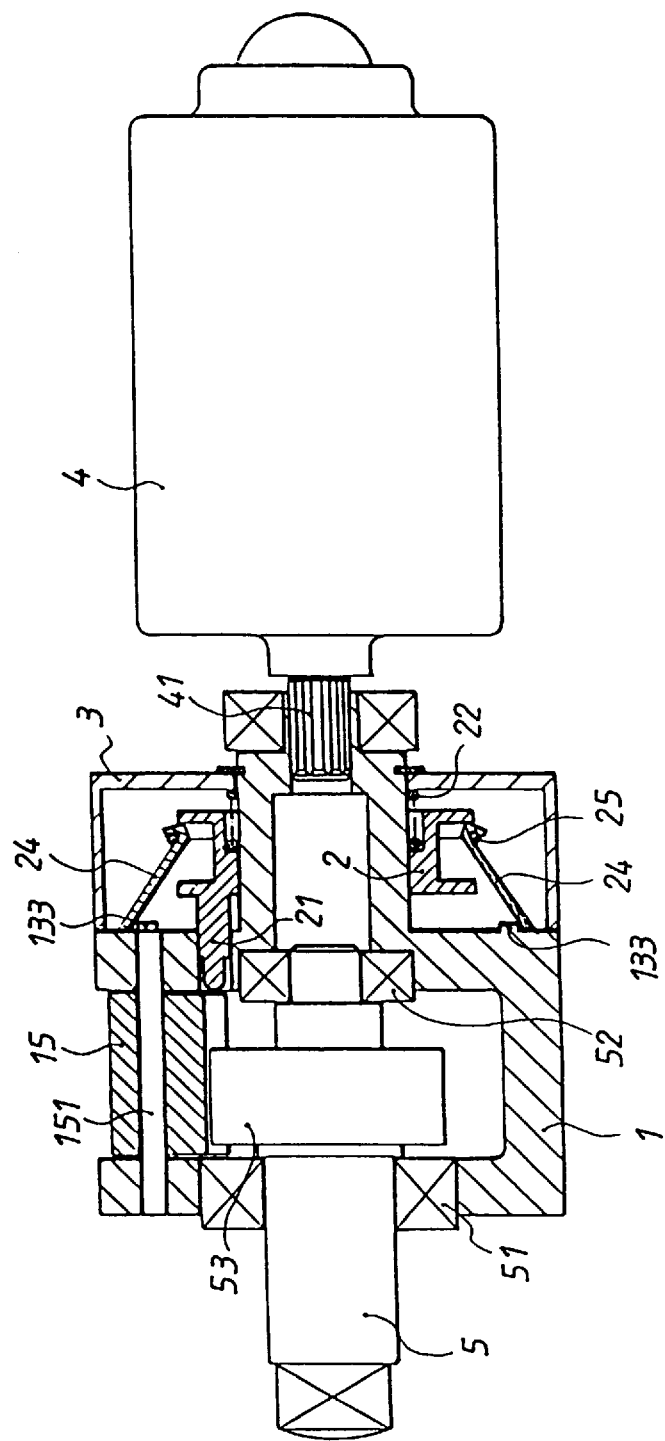
FIG. 5 is similar to FIG. 4 but showing the locating pins of the clutch released from the eccentric block, the eccentric block forced into engagement with the fixed coupling block of the output shaft.

Referring to FIG. 5 and FIG. 4 again, when the reversible motor 4 does no work, the compression spring 22 imparts forward pressure to the clutch 2, causing the locating pins 21 to be fully inserted into the insertion holes 132 of the rotary base 1 and stopped below the eccentric block 15, and therefore the eccentric block 15 is stopped from biasing, i.e., the eccentric block 15 is disengaged from the fixed coupling block 53 of the output shaft 5. Therefore, at the initial stage after the operation of the reversible motor 4, only the rotary base 1 and the clutch 2 are turned with the reversible motor shaft 41 of the reversible motor 4. A certain length of time after the operation of the reversible motor 4, sufficient centrifugal force is produced to expand the actuating plates 24, causing them to push the clutch 2 backwards from the rotary base 1 toward the reversible motor 4, and therefore the eccentric block 15 is released from the constraint of the locating pins 21 of the clutch 2 and forced by eccentric force into engagement with the fixed coupling block 53 of the output shaft 5 (see FIG. 5). When the eccentric block 15 and the fixed coupling block 53 are engaged together, the output shaft 5 is turned with the rotary base 1. Because the three actuating plates 14 are evenly mounted at every 120° angle around the rotary clutch 2, stable rotary output force is smoothly transmitted from the reversible motor shaft 41 to the output shaft 4 through the clutch 2 and the rotary base 1. When the output shaft 5 is stopped by an object (for example, when the electric drill is used to fasten a bolt in a vehicle tire, the output shaft 5 will be stopped when the bolt is fastened up), the revolving speed of the rotary base 1 will be gradually reduced, and the actuating plates 24 will be received and closed on the clutch 2, thereby causing the locating pins 21 of the clutch 2 to be forced by the spring force of the compression spring 22 into contact with the bottom side of the eccentric block 15 in disconnecting it from the fixed coupling block 53 of the output shaft 5, and therefore the rotary power is disconnected from the output shaft 5. Further, a forward/backward control switch is provided for controlling the turning direction of the reversible motor 4.

While only one embodiment of the present invention has been shown and described, it will be understood that various modifications and changes could be made thereunto without departing from the spirit and scope of the invention disclosed.

What the invention claimed is:

1. A centrifugal force-controlled coupling switch mechanism coupled between a reversible motor shaft of a reversible motor and an output shaft for controlling transmission of rotary driving power from said reversible motor to said output shaft, comprising:

a rotary base having an outer race, an inner race, a hemispherical shell axially connected between said outer race and said inner race, and an eccentric block turned about a pivot pin between said outer race and said inner race at an eccentric location, said inner race comprising a backwardly extended stepped center tube coupled to the reversible motor shaft of said reversible motor, and two insertion holes bilaterally disposed adjacent said pivot pin, said eccentric block being forced into engagement with a fixed coupling block of said output shaft for permitting said output shaft to be turned with said rotary base when said eccentric block receiving a centrifugal force during the rotary motion of said rotary base, a cap mounted around the stepped center tube of said rotary base and secured thereto by a clamp and covered on one side of said inner race; and clutch means mounted around the stepped center tube of said rotary base within said cap and adapted to control the engagement between said eccentric block of said rotary base and the fixed coupling block of said output shaft, said clutch means comprising a clutch body having an annular groove around the periphery and two forwardly extended locating pins adapted for inserting into the insertion holes of said rotary base to disengage said eccentric block from the fixed coupling block of said output shaft, a plurality of smoothly curved actuating plates fastened to the annular groove of said clutch body by a spring retainer, and spring means connected between said cap and said clutch means, said smoothly curved actuating plates being forced by a centrifugal force to expand and to push said clutch body backwards in disengaging its locating pins from said eccentric block for permitting said eccentric block to be forced into engagement with the fixed coupling block of said output shaft by the centrifugal force when said rotary base is turned with said clutch body by the reversible motor shaft of said reversible motor, said spring means imparting a forward pressure to said clutch body causing the locating pins of said clutch body to be retained inserted into said insertion holes of said rotary base to disengage said eccentric block from the fixed coupling block of said output shaft.

* * * * *